United States Patent [19]

Englund

[11] Patent Number: 4,913,565
[45] Date of Patent: Apr. 3, 1990

[54] AXIAL BEARING DEVICE

[75] Inventor: Arnold Englund, SpÅnga, Sweden

[73] Assignee: Svenska Rotor Maskiner AB, Stockholm, Sweden

[21] Appl. No.: 303,664

[22] PCT Filed: Aug. 19, 1987

[86] PCT No.: PCT/SE87/00365
§ 371 Date: Jan. 23, 1989
§ 102(e) Date: Jan. 23 1989

[87] PCT Pub. No.: WO88/01353
PCT Pub. Date: Feb. 25, 1988

[30] Foreign Application Priority Data

Aug. 20, 1986 [SE] Sweden .................. 8603527-6

[51] Int. Cl.$^4$ .................................. F16C 19/10
[52] U.S. Cl. ......................... 384/617; 384/903
[58] Field of Search ............. 384/617, 620, 585, 537, 384/626, 903

[56] References Cited

U.S. PATENT DOCUMENTS 3,397,021  8/1968  Fitzsimmons .................. 384/585
4,613,240  9/1986  Hagelthorn .................... 384/585
4,732,497  3/1988  Sawa et al. .................... 384/585

Primary Examiner—Lenard A. Footland
Attorney, Agent, or Firm—Frishauf, Holtz, Goodman & Woodward

[57] ABSTRACT

This invention relates to a thrust bearing arrangement in which a thrust bearing (17, 18) is brought to a given position on an axle or shaft (15, 16) and secured firmly in this position by means of a locking ring (23, 24) capable of being displaced along the axle or shaft. In order to enable this arrangement to be achieved quickly and easily, the locking ring has the form of a shrink ring (23, 24) which is heated to an appropriate temperature and then slid along a smooth part of the axle (15, 16). The shrink ring is dimensioned so that it will shrink firmly around the axle (15, 16) when cooled to normal operating temperature, so as to be immovable on the axle when subjected to axial forces occurring in operation. The thrust bearing (17, 18) is positioned, according to the invention, in a bearing seating, which enables the transverse insertion of a feeler gauge or corresponding device to provide a given clearance at a selected end of the bearing (17, 18) prior to shrink fitting the locking ring (23, 24).

3 Claims, 1 Drawing Sheet

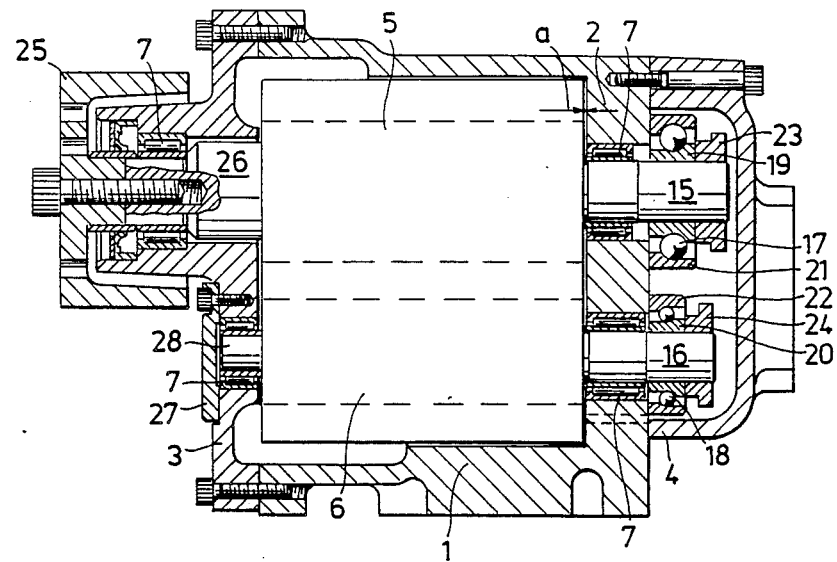

AXIAL BEARING DEVICE

BACKGROUND OF THE INVENTION

The present invention relates to a thrust bearing arrangement, in which a thrust bearing is brought to a given position on an axle or a shaft and subsequently secured in said position.

Normally, a thrust bearing is moved to a given setting or position on an axle and secure preliminary in this position by means of washers, shims or like devices, whereafter a locking ring is screwed along the axle into locking abutment with the bearing. This procedure, however, is highly time consuming and also assumes that the setting of the thrust bearing can be checked in some way or another.

The object of this invention is to provide a thrust bearing arrangement of the aforesaid kind which will enable the thrust bearing to be brought to a given position or setting on an axle and quickly secured in said position in a simple manner.

SUMMARY OF THE INVENTION

According to the present invention, a specific clearance is set between an end wall of a rotor and an inner surface of a high pressure end wall of a screw rotor compressor while mounting an axle of said rotor in a thrust bearing in a bearing seating in said high pressure end wall by providing the high pressure end wall of the screw rotor compressor with an access space to provide radial access to the bearing seating; and transversely inserting a feeler gauge in the radial access space at one or another end surface of the thrust bearing. The rotor is into abutment with the inner surface of the high pressure end wall; a separate heated shrink ring is pushed over the axle of the rotor and pressed against the thrust bearing with the feeler gauge still in position in the radial access space at an end surface of the thrust bearing; and then the feeler gauge is removed after shrink ring has cooled down.

BRIEF DESCRIPTION OF THE DRAWINGS

The invention will now be described in more detail with reference to the accompanying drawing, the single FIGURE of which illustrates in longitudinal section a screw compressor provider with a thrust bearing arrangement according to one embodiment of the invention.

DETAILED DESCRIPTION

The illustrated screw compressor comprises a housing 1 which incorporates a high-pressure end wall 2. An end wall 3 is screwed firmly onto the low pressure side and the high-pressure end wall 2 carries a casing 4. A male rotor 5 and a female rotor 6 are rotatably journalled in the housing 1, in radial bearings 7.

The rotors 5, 6 are provided on the high pressure side with respective bearing trunnions 15, 16 which extend externally beyond the high-pressure end wall 2. A respective thrust bearing 17, 18 is mounted on each of the outwardly projecting trunnions 15, 16. Each of the thrust bearings comprises a rolling bearing having a respective inner race 19 and 20, which is slideably mounted on a respective trunnion 15, 16, and an outer race 21 and 22 which abut the outer surface of the end wall 2. A locking ring 23 and 24 is shrink-fitted on a respective trunnion in abutment with a respective inner race 19 and 20.

All play, or clearance, between the shrink rings 23, 24, the thrust bearings 17, 18 and the outer surface of the end wall 2 is eliminated when the rotors 5, 6 are urged in a direction towards the low-pressure end wall 3, while an intended clearance a of 0.04–0.05 mm is obtained between the inner surface of the end wall 2 and the high-pressure end surfaces of the rotors 5, 6 when the shrink rings 23, 24 are locked to the trunnions 15, 16 in precisely the correct position.

This thrust bearing arrangement to produce the above results is achieved quickly and easily, by simply displacing the rotors 5, 6 into abutment with the inner surface of the high-pressure end wall 2, prior to fitting the shrink rings, by appropriate manipulation of the low pressure trunnions, to which access could be obtained via a belt pulley 25 mounted on the low pressure trunnion 26 of the male rotor 5 and by removing a cover plate 27 outside the low pressure trunnion 28 of the female rotor.

Casing 4 is removed from the high-pressure end wall 2 to provide an access space for a feeler gauge or the like. A feeler gauge, or corresponding device, whose thickness corresponds to the intended clearance a is then inserted between respective outer races 21, 22 and the outer surface of the high-pressure end wall 2. This could be readily carried out, since the thrust bearings 17, 18 are not yet secured in position. Heated shrink rings 23, 24 are then pushed over respective trunnions 15, 16 and pressed against the outer surfaces of respective inner races 19 and 20. As the shrink rings 23, 24 cool, they shrink firmly around the trunnions 15, 16 and therewith fix the clearance a.

It will be understood that the invention is not restricted to the illustrated and described embodiment and that modifications can be carried out within the concept of the invention. For example, the invention may be applied with other types of thrust bearings. Furthermore, an enhanced temperature differential can be achieved when fitting the shrink rings 23, 24, by forced cooling of the trunnions 15, 16.

I claim:

1. A screw rotor compressor in which a specific clearance can be set between an end wall of a rotor and an inner surface of a high pressure end wall of the screw rotor compressor, comprising:

a bearing seating in said high pressure end wall for receiving a thrust bearing;

said rotor of said compressor having an axle portion which extends externally beyond an outer surface of said high pressure end wall;

a thrust bearing mounted on said externally extending axle and received in said bearing seating;

means at said high pressure end wall of said screw rotor compressor for defining an access space to provide radial access to said bearing and bearing seating;

a feeler gauge transversely insertable in said radial access space at one or another end surface of said thrust bearing;

wherein said rotor is displaced into abutment with said inner surface of said high pressure end wall;

a separate heated shrink ring which is mounted over said axle of said rotor with said thrust bearing interposed between said heated shrink ring and said high pressure end wall, said heated shrink ring being pressed against said thrust bearing with said feeler gauge still in position in said radial access space at said one or said another end surface of said thrust bearing; and wherein said feeler gauge is removed after said shrink ring has cooled down, said shrink ring shrinking and being thereby fixed to said rotor axle when cooled down.

2. The apparatus of claim 1, wherein said thrust bearing has an end surface which faces said high pressure end wall, and wherein said feeler gauge is inserted between the outer surface of said high pressure end wall and said thrust bearing end surface which faces said high pressure end wall.

3. The apparatus of claim 1, wherein said thrust bearing has inner and outer races, and wherein said feeler gauge is inserted between said outer race and the outer surface of said high pressure end wall.

* * * * *